US012573615B2

(12) United States Patent
Sasaki et al.

(10) Patent No.: US 12,573,615 B2
(45) Date of Patent: Mar. 10, 2026

(54) ALL-SOLID-STATE BATTERY AND METHOD OF MANUFACTURING THE SAME

(71) Applicants: Hyundai Motor Company, Seoul (KR); Kia Corporation, Seoul (KR)

(72) Inventors: Yuki Sasaki, Yokohama-City (JP); Yong Sub Yoon, Seoul (KR); Hajime Tsuchiya, Yokohama-City (JP); Hironari Takase, Yokohama-City (JP)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 233 days.

(21) Appl. No.: 17/524,385

(22) Filed: Nov. 11, 2021

(65) Prior Publication Data

US 2022/0384785 A1 Dec. 1, 2022

(30) Foreign Application Priority Data

May 28, 2021 (JP) .................................. 2021-90642

(51) Int. Cl.
        *H01M 10/0562* (2010.01)
        *H01M 4/04* (2006.01)
        *H01M 4/36* (2006.01)
(52) U.S. Cl.
        CPC ......... *H01M 4/366* (2013.01); *H01M 4/0433* (2013.01); *H01M 10/0562* (2013.01)
(58) Field of Classification Search
        CPC . H01M 10/0585; H01M 10/0562; H01M 2/26
        See application file for complete search history.

(56) References Cited

U.S. PATENT DOCUMENTS

2021/0066758 A1* 3/2021 Tomoyuki ............. H01M 4/382

FOREIGN PATENT DOCUMENTS

| JP | 2011096470 A | 5/2011 |
|----|--------------|--------|
| JP | 2012069248 A | 4/2012 |
| JP | 2014120199 A | 6/2014 |
| JP | 2014127272 A | 7/2014 |
| JP | 2014127643 A | 7/2014 |
| JP | 2014222564 A | 11/2014 |
| JP | 2015125872 A | 7/2015 |
| JP | 2015162353 A | 9/2015 |

(Continued)

*Primary Examiner* — Osei K Amponsah
(74) *Attorney, Agent, or Firm* — SLATER MATSIL, LLP

(57) ABSTRACT

A method of manufacturing an all-solid-state battery includes forming an anode active material layer on surfaces of an anode current collector, forming a first solid electrolyte layer covering exposed surfaces of the anode active material layer to form a symmetrical electrode structure, pressing the structure at a preliminary pressing pressure lower to form an anode, forming a cathode active material layer on a surface of cathode current collectors, the cathode active material layer being smaller than the cathode current collectors, forming a second solid electrolyte layer covering the cathode active material layers and the cathode current collectors to form first and second cathodes, forming a laminate by laminating the cathodes on opposite surfaces of the anode, the second solid electrolyte layers of the cathodes facing the anode, and pressing the laminate at the final pressing pressure.

12 Claims, 10 Drawing Sheets

(56)                 References Cited

FOREIGN PATENT DOCUMENTS

| JP | 2017199668 | A | 11/2017 |
|----|------------|---|---------|
| JP | 2018147621 | A | 9/2018 |
| JP | 2019160516 | A | 9/2019 |

* cited by examiner

11

12

11

12

11

12

21

24
21

22

21

22

21

24

High-pressure pressing

High-pressure pressing

Short-circuit

Short-circuit

FIG. 7

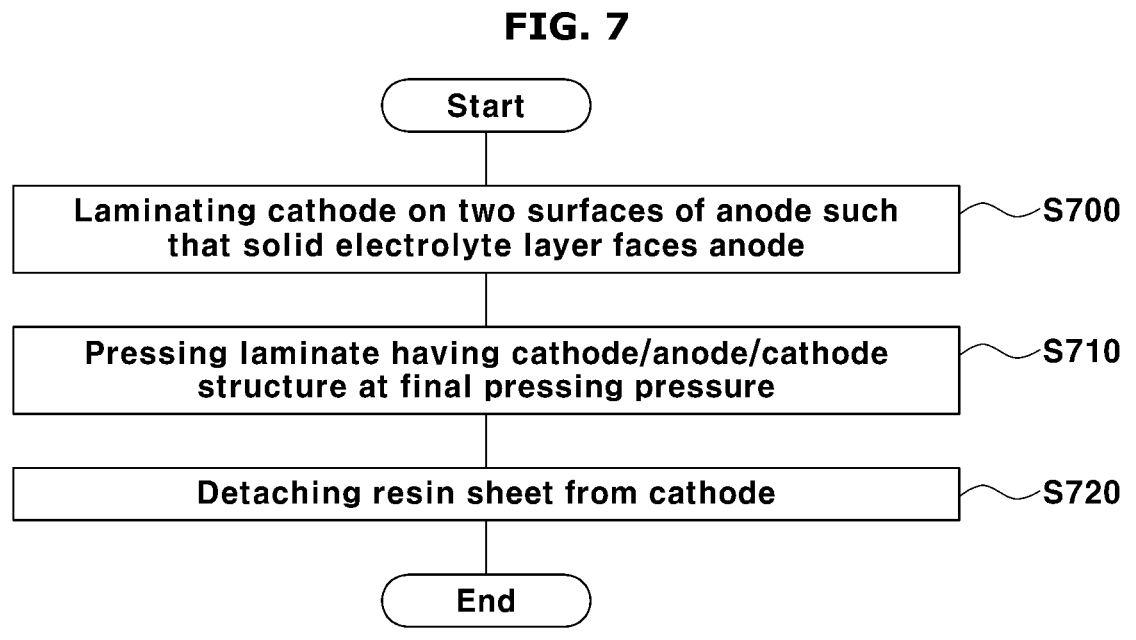

Start

Laminating cathode on two surfaces of anode such that solid electrolyte layer faces anode ～S700

Pressing laminate having cathode/anode/cathode structure at final pressing pressure ～S710

Detaching resin sheet from cathode ～S720

End

ALL-SOLID-STATE BATTERY AND METHOD OF MANUFACTURING THE SAME

CROSS-REFERENCE TO RELATED APPLICATIONS

This application claims the benefit of Japanese Patent Application No. 2021-90642, filed on May 28, 2021, which application is hereby incorporated herein by reference.

TECHNICAL FIELD

The present invention relates to an all-solid-state battery and a method of manufacturing the same.

BACKGROUND

Lithium ion batteries including accumulator batteries for automobiles are widely used and have become indispensable in many fields as high-capacity, small and lightweight secondary batteries. However, currently used lithium ion batteries utilize a non-aqueous electrolyte as an electrolyte, thus having a problem in that there is the risk of ignition or explosion depending on the usage. In an attempt to solve this problem, there is increasing need for the development for an all-solid-state battery using a solid electrolyte as an electrolyte.

A method of manufacturing a bulk-type all-solid-state battery, which is mainly being researched, uses a powder material, and includes laminating a cathode active material layer serving as a cathode, an anode active material layer serving as an anode, and a solid electrolyte layer between the cathode and the anode and press-molding the resulting laminate at a high pressure to form a laminated structure.

When the cross-sections of the cathode active material layer and the anode active material layer are exposed, deformation is caused by the elongated or collapsed outer periphery of the laminated structure during press-molding of the laminated structure, resulting in an increased possibility of the ends of the cathode active material layer and the anode active material layer coming into contact with each other and thus causing a short circuit. Further, an all-solid-state battery which is deformed due to the elongated outer periphery of the anode active material layer is vulnerable to precipitation of lithium at the end of the anode when charged and is more easily short-circuited. Therefore, measures are being taken to change the sizes of the cathode active material layer and the anode active material layer in order to ultimately prevent short circuits at the end.

When the sizes of the cathode active material layer and the anode active material layer are changed and a laminated structure is formed and then pressed, the following problems may occur. When any one of the cathode active material layer and the anode active material layer is smaller than the other, for example, when the cathode active material layer is smaller than the anode active material layer, the outer periphery of the cathode active material layer is easily deformed by pressing and the electrode layer in the collapsed portion cannot be used effectively, whereby the area of the effective active material layer may be reduced and the performance of the battery may be insufficient. In addition, the anode active material layer, which generally uses graphite as an anode active material, is softer than the cathode active material layer, so the cathode active material layer may break the solid electrolyte layer during pressing and may be eroded into the anode active material layer, and the end of the cathode active material layer and the anode active material layer may come into contact, thereby forming a short circuit.

Measures to solve the problem whereby the outer periphery of the cathode active material layer collapses and the effective area decreases are considered as shown in Japanese Patent Laid-open Publication No. 2014-127643 ("Patent Document 1").

Patent Document 1 discloses a method of manufacturing an all-solid-state battery including a cathode layer, a solid electrolyte layer, and an anode layer, wherein a short circuit can be prevented by forming the outer periphery of the electrode layer of the smaller one of the cathode layer and the anode layer to be thicker than the central portion thereof so as to subsequently form an electrode layer having a uniform density and thickness after pressing. However, making the outer periphery of the smaller electrode layer thicker may cause the outer periphery to expand more easily, increasing the risk of a short circuit near the end of the larger electrode layer. For this reason, there is a need to increase the difference in size between the cathode layer and the anode layer.

Further, Japanese Patent Laid-open Publication No. 2014-127272 ("Patent Document 2") discloses a method of manufacturing an all-solid-state battery including a cathode layer, a solid electrolyte layer, and an anode layer, the method including performing pressing such that the outer periphery of the larger electrode layer, among the cathode layer and the anode layer, is compressed in the central portion, laminating the larger electrode layer with the smaller electrode layer thereamong and then pressing the resulting laminate, thereby preventing erosion of the end of the smaller electrode layer into the larger electrode layer. In accordance with Patent Document 2, the end of the smaller electrode layer at an initial stage of the pressing does not directly contact the solid electrolyte layer on the larger electrode layer, so the erosion of the smaller electrode layer into the larger electrode layer can be reduced, but the overall non-uniformity may result unless the pressing pressure is not strictly controlled by performing primary non-uniform pressing on the larger electrode layer and then laminating the smaller electrode layer and performing secondary pressing to achieve evenness.

Therefore, it is desirable to provide an all-solid-state battery in which the occurrence of a short circuit is suppressed even when a cathode active material layer and an anode active material layer having different sizes are laminated with a solid electrolyte layer interposed therebetween and the resulting structure is then pressed at a high pressure, and a method of manufacturing the same.

The above information disclosed in this Background section is only for enhancement of understanding of the background of the invention, and therefore it may contain information that does not form the prior art that is already known to a person of ordinary skill in the art.

SUMMARY

The present invention relates to an all-solid-state battery and a method of manufacturing the same. Particular embodiments relate to an all-solid-state battery and a method of manufacturing the same that are capable of preventing an internal short circuit by forming a solid electrolyte layer on the upper and side surfaces of a cathode active material layer, which is smaller than an anode active material layer, laminating the solid electrolyte layer with a preliminarily pressed anode, and finally pressing the resulting laminate.

Embodiments of the present invention can solve problems associated with the prior art, and an embodiment of the present invention provides an all-solid-state battery and a method of manufacturing the same that are capable of preventing an internal short circuit by forming a solid electrolyte layer on the upper and side surfaces of a cathode active material layer which is smaller than an anode active material layer, laminating the solid electrolyte layer with a preliminarily pressed anode, and finally pressing the resulting laminate.

One embodiment of the present invention provides a method of manufacturing an all-solid-state battery including forming an anode active material layer on each of two surfaces of an anode current collector such that the anode active material layer is smaller than the anode current collector and the anode current collector is exposed to an outer periphery, and further forming a solid electrolyte layer so as to cover the anode active material layer on each of two surfaces thereof to form a symmetrical electrode structure, pressing the symmetrical electrode structure at a preliminary pressing pressure lower than a final pressing pressure to form an anode, forming a cathode active material layer on one surface of a cathode current collector such that the cathode active material layer is smaller than the cathode current collector and the cathode current collector is exposed to an outer periphery, and further forming a solid electrolyte layer so as to cover the cathode active material layer and the cathode current collector on the outer periphery to form a cathode having the same planar shape as the anode, and laminating two cathodes including the cathode on respective surfaces of the anode such that the solid electrolyte layer of the cathode faces the anode, and pressing the cathodes at the final press pressure.

The forming the cathode may include attaching a resin sheet to a remaining surface of the cathode current collector in advance, and the pressing at the final pressing pressure may include performing pressing after placing a resin sheet on each of the two cathodes disposed on respective surfaces of the anode.

In each of the upper and lower dies of the press die used in the pressing at the final pressing pressure, an elastic body may be provided on an outer peripheral wall of a groove for accommodating the anode and the cathode after lamination to prevent lateral deformation of the cathode and the anode after lamination.

Another embodiment of the present invention provides an all-solid-state battery including an anode including an anode current collector, an anode active material layer formed on each of two surfaces of the anode current collector such that the anode active material layer is smaller than the anode current collector and the anode current collector is exposed to an outer periphery, and a solid electrolyte layer formed so as to cover the anode active material layer and the anode current collector on the outer periphery, and a cathode including a cathode current collector, a cathode active material layer formed on one surface of the cathode current collector such that the cathode active material layer is smaller than the cathode current collector, and a solid electrolyte layer formed to cover the cathode active material layer and the cathode current collector on the outer periphery, the cathode having the same planar shape as the anode, the all-solid-state battery including a laminated structure formed by laminating the cathode on two surfaces of the anode such that the solid electrolyte layer of the cathode faces the anode, followed by pressing.

Other aspects and preferred embodiments of the invention are discussed infra.

BRIEF DESCRIPTION OF THE DRAWINGS

The above and other features of embodiments of the present invention will now be described in detail with reference to certain exemplary embodiments thereof, illustrated in the accompanying drawings, which are given hereinbelow by way of illustration only, and thus are not limitative of the present invention, and wherein:

FIG. 4, which includes

FIG. 7 is a flowchart illustrating a method of forming a laminated structure of an all-solid-state battery according to an embodiment of the present invention.

DETAILED DESCRIPTION OF ILLUSTRATIVE EMBODIMENTS

Hereinafter, preferred embodiments of an all-solid-state battery and a method of manufacturing the same according to the present invention will be described in detail with reference to the accompanying drawings.

Figure 1:
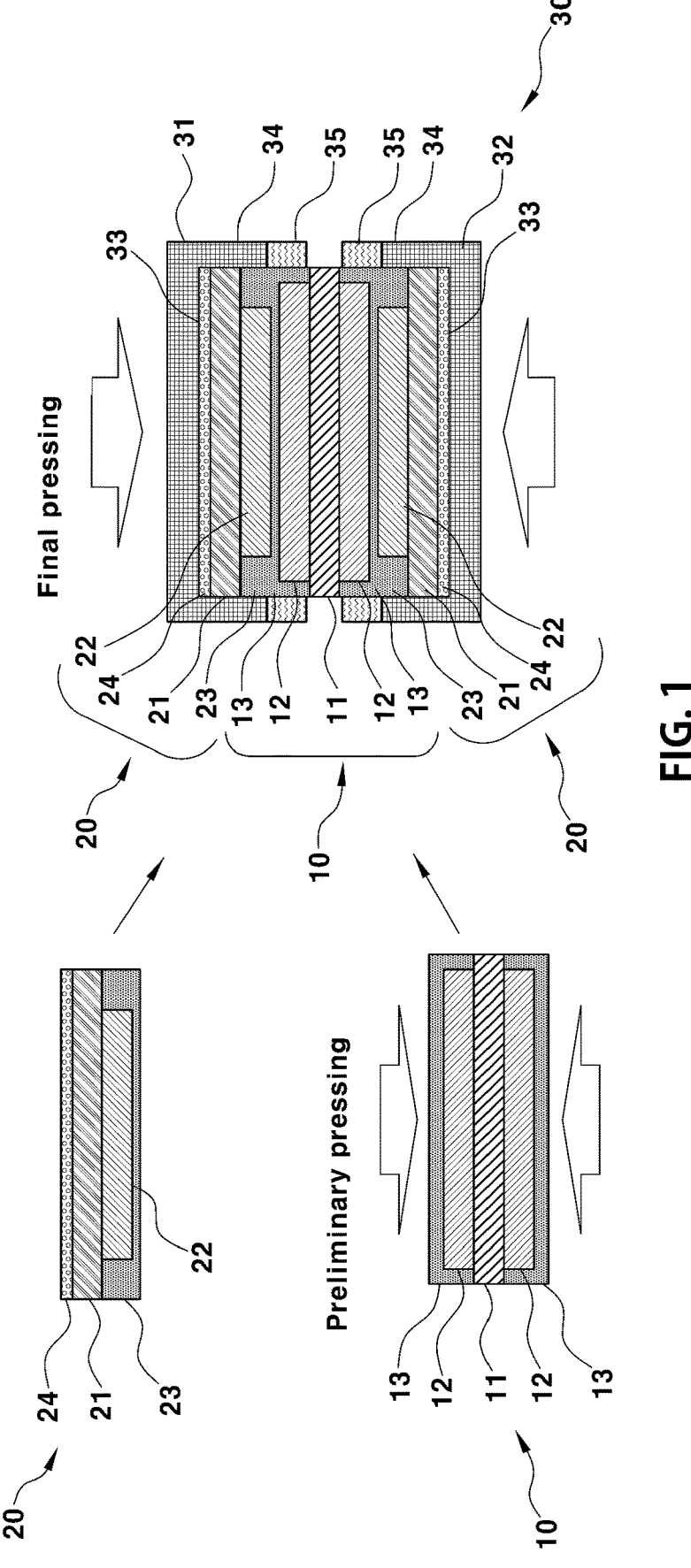
FIG. 1 is a schematic diagram illustrating a method of manufacturing an all-solid-state battery according to an embodiment of the present invention.

FIG. 1 illustrates the structure of an anode 10 and a cathode 20 before performing final pressing on a laminate, and the state in which the anode 10 and two cathodes including the cathode 20 are laminated in the order of cathode 20/anode 10/cathode 20 and final pressing is then performed in a press die 30. Before describing the details of FIG. 1, the problem associated with the laminate pressing of the related art will be briefly described with reference to FIG. 4.

Figure 4A:
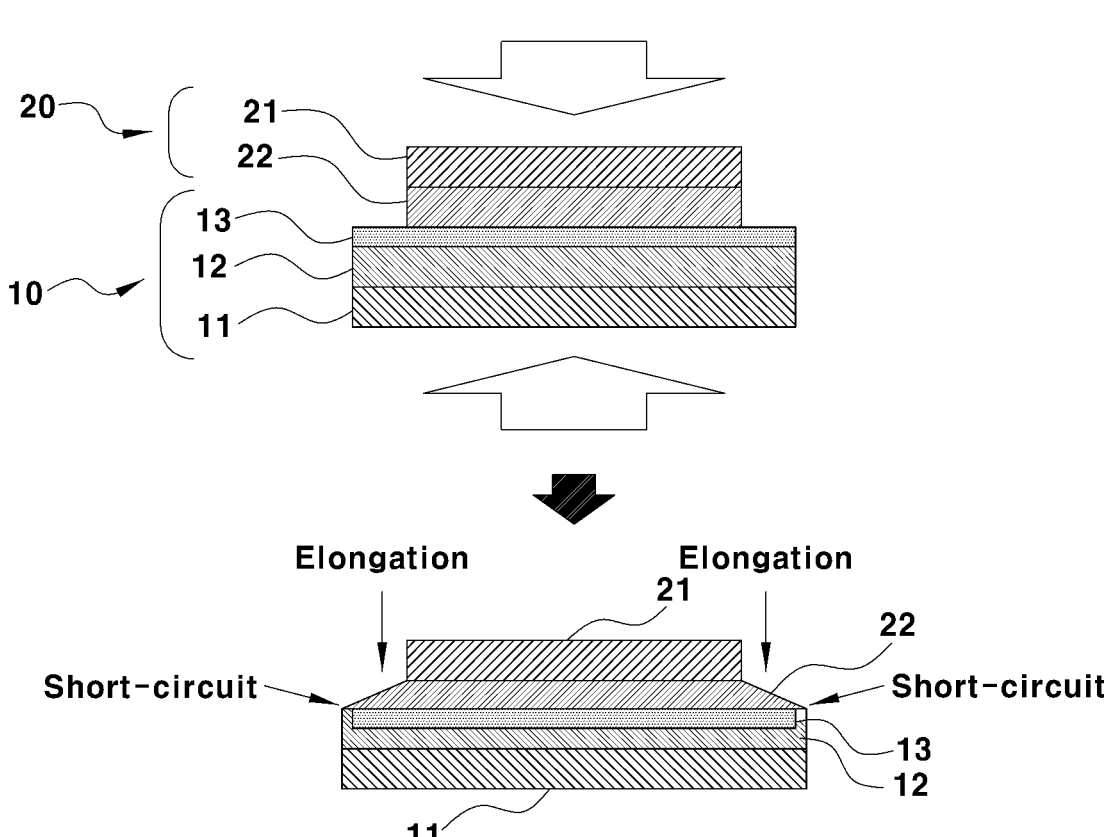
FIGS. 4A and 4B, illustrates problems of a method of manufacturing an all-solid-state battery according to the related art.
Figure 4B:
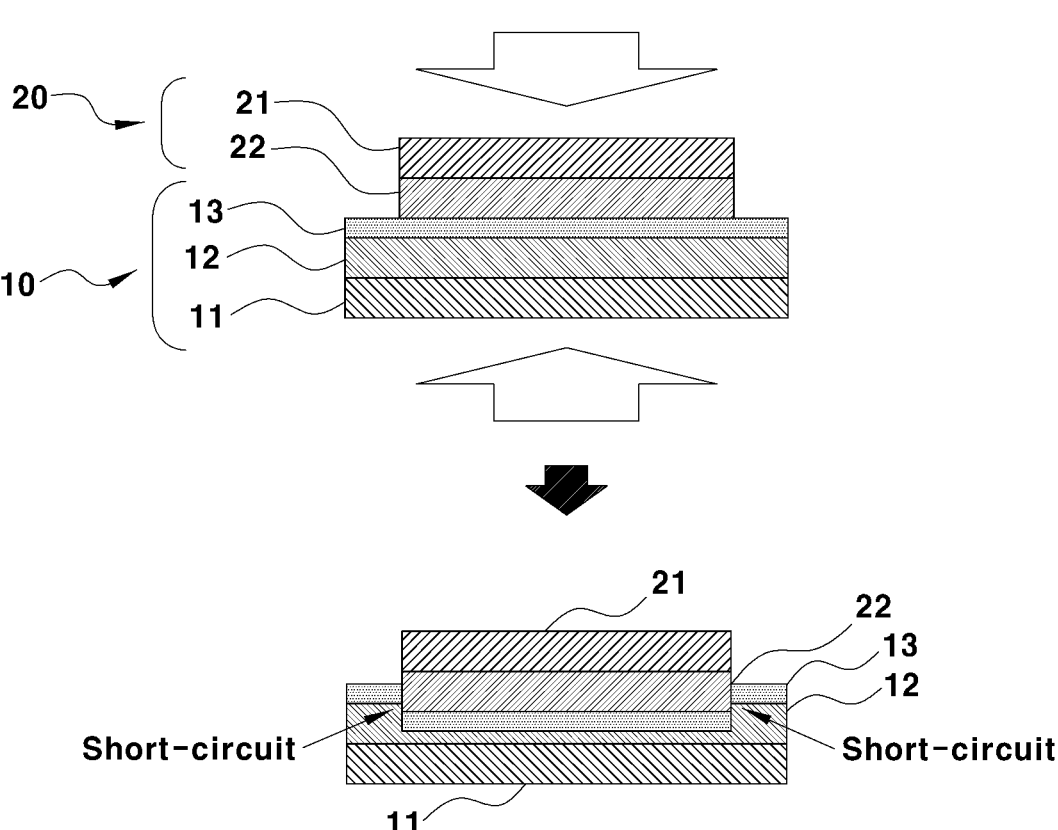

FIG. 4 illustrates a method of manufacturing an all-solid-state battery according to the related art.

Referring to FIG. 4, a cathode 20, which is smaller than the anode 10 and includes a cathode active material layer 22 formed on one surface of a cathode current collector 21, overlaps an anode 10 including an anode active material layer 12 and a solid electrolyte layer 13 formed in that order on one surface of an anode current collector 11, such that the cathode active material layer 22 faces the solid electrolyte layer 13, and the resulting structure is then pressed at a pressure of 500 MPa or more to form a laminated structure of the electrode. Such pressing may cause a short circuit due to contact between the anode 10 and the cathode 20, as shown in examples A and B.

Example A of FIG. 4 illustrates a mode in which by pressing, the cathode active material layer 22 of the cathode 20 is stretched in the outer peripheral direction, the anode active material layer 12 of the anode 10 is also stretched in the peripheral direction, and the solid electrolyte layer 13 is pressed and spread in a side direction and short-circuited in the vicinity of the outer periphery thereof.

Example B of FIG. 4 illustrates a mode in which the solid electrolyte layer 13 in contact with the end of the cathode active material layer 22 is broken by compressive stress at the time of pressing from the cathode active material layer 22, which is smaller than the anode 10, and the cathode active material layer 22 is eroded into the anode active material layer 12, thus resulting in a short circuit between the cathode active material layer 22 and the anode active material layer 12. This is due to the fact that the graphite used for the anode active material layer 12 is softer than the cathode active material layer 22, which is represented by an oxide such as $LiNi_{1/3}Co_{1/3}Mn_{1/3}O_2$.

Referring to FIG. 1 again, in order to prevent the problem of a short circuit according to the prior art, the cathode 20 of the all-solid-state battery according to an embodiment of the present invention includes a cathode current collector 21, a cathode active material layer 22 formed on one surface of the cathode current collector 21 such that the cathode current collector 21 is exposed on the outer periphery so as to be smaller than the cathode current collector 21, and a solid electrolyte layer 23 formed to cover the cathode active material layer 22 and the cathode current collector 21, which is exposed to the outer periphery of the cathode active material layer 22. Based on this configuration, the upper surface and the side surface of the cathode active material layer 22 are covered with the solid electrolyte layer 23 so the cathode active material layer 22 is not exposed to the outside. Because the side of the cathode active material layer 22 is embedded in the solid electrolyte layer 23, it is possible to prevent the cathode active material layer 22 from stretching in the outer peripheral direction, as shown in example A of FIG. 4, when the combination of the cathode 20 and the anode 10 is finally pressed at a high pressure.

In addition, a resin sheet 24 is attached to the surface of the cathode 20 on which the cathode active material layer 22 is not formed. This surface is the surface that contacts the bottom surface of a groove 33 of the press die 30 at the time of final pressing, and has effects of providing uniform pressure distribution at the time of final pressing using the resin sheet 24 and of preventing the end of the cathode active material layer 22 from being cleaved.

Meanwhile, the anode 10 of the all-solid-state battery according to an embodiment of the present invention includes an anode current collector 11, an anode active material layer 12 formed on each of two surfaces of the anode current collector 11, and a solid electrolyte layer 13 further formed on the upper surface of the anode active material layer 12. A symmetrical electrode structure is formed centering on the anode current collector 11. However, in an embodiment, preliminary pressing is performed at a pressure lower than a final pressing pressure for forming a final laminated structure of the electrode in this state, and the cathode active material layer 22, which is softer than the anode active material layer 12, is densified. In one embodiment, the final pressing pressure is 500 MPa, and the preliminary pressing pressure is 100 MPa or less. The combination of the final pressing pressure of 500 MPa and the preliminary pressing pressure of 100 MPa is provided as an example, but the pressures are not limited thereto, as long as the preliminary pressing pressure is lower than the final pressing pressure. By performing preliminary pressing, erosion of the cathode active material layer 22 into the anode active material layer 12 as shown in example B of FIG. 4 can be suppressed.

The cathode 20 and the anode 10 having the same structure as described above are combined to form an electrode of an all-solid-state battery. However, in the embodiment of the present invention, the cathode 20 is laminated on two surfaces of the anode 10 such that the solid electrolyte layer 23 of the cathode 20 faces the anode 10 and final pressing is performed at a predetermined pressure in the press die 30. The symmetric laminated structure formed by disposing the cathode 20 on both sides of the anode 10 is capable of suppressing warping after final pressing.

In the embodiment, the cathode current collector 21 and the anode current collector 11 may have different thicknesses, but may have the same external shape in a plan view. The cathode active material layer 22 is formed on the cathode current collector 21 to be smaller than the cathode current collector 21, but the cathode 20 has a planar surface having the same shape as the upper surface of the anode 10 because the upper and side surfaces of the cathode active material layer 22 are covered with the solid electrolyte layer 23. As a result, when the anode 10 and the cathode 20 are laminated to face each other, planar surfaces of the anode 10 and the cathode 20 having the same shape come into contact with each other. For this reason, even when the final pressing pressure is applied, it is difficult to generate concentrated stress at the end of the cathode active material layer 22, and consequently, it is possible to suppress the erosion of the cathode active material layer 22 into the anode active material layer 12.

Furthermore, in the embodiment, in each of an upper die 31 and a lower die 32 of the press die 30 used for the final pressing, an elastic body 35 is provided on an outer peripheral wall 34 of a groove 33 accommodating the anode 10 and the cathode 20 after lamination. As a result, deformation in the lateral direction of the cathode 20 and the anode 10 after lamination in the final pressing is prevented. The elastic body 35 adjusts or selects the height and elasticity in order to suppress deformation in the lateral direction of the cathode 20 and the anode 10 after lamination when final pressing is performed, and at the same time, to correctly apply the pressure of the press die 30 to the cathode after lamination. In addition, it is preferable that the portion of the press die in contact with the laminated structure be coated with a resin.

Next, a method of manufacturing each of the anode 10 and the cathode 20 is described.

FIGS. 2A-2F are schematic diagrams illustrating a method of manufacturing an anode of an all-solid-state battery according to an embodiment of the present invention. FIGS. 2A-2F illustrate a change in structure following the progression of the method of manufacturing the anode from FIG. 2A to FIG. 2F.

Figure 2A:
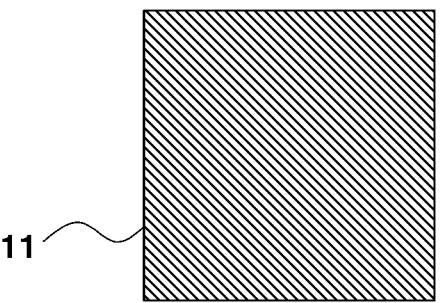
FIGS. 2A-2F are schematic diagrams illustrating a method of manufacturing an anode of an all-solid-state battery according to an embodiment of the present invention.

FIG. 2A illustrates an anode current collector 11 as a base. Although copper is widely used as the anode current collector 11, stainless steel, nickel, or the like may be used. The anode current collector 11 has a flat plate shape, and is shown as having a rectangular planar shape. However, the anode current collector 11 may be any other shape, such as a circle, as long as it finally has the same planar shape as the cathode 20.

Figure 2B:
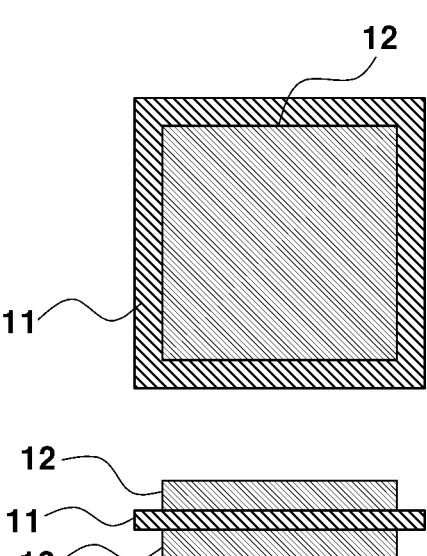

FIG. 2B illustrates the state in which the anode active material layer 12 is formed on two surfaces of the anode current collector 11. In the embodiment, graphite is used as the material of the anode active material layer 12. The anode active material layer 12 may be uniformly formed over the entire surface of the anode current collector 11. However, in one embodiment, the anode active material layer 12 is formed on two surfaces of the anode current collector 11, so the anode active material layer 12 is formed such that the outer periphery of the anode current collector 11 is left in order to easily fix or turn over the anode current collector 11.

Figure 2C:
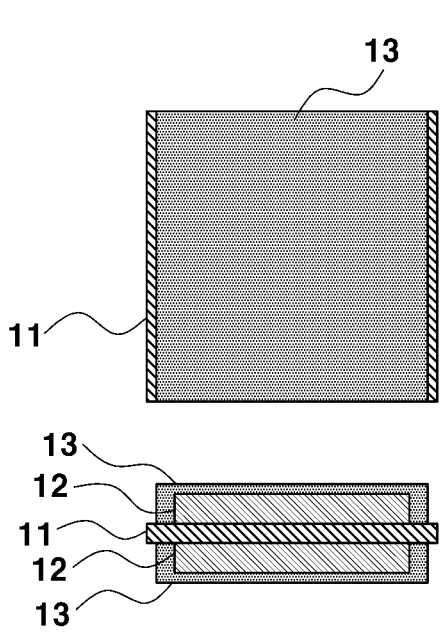

FIG. 2C illustrates the state in which a solid electrolyte layer 13 is further formed to cover each of the anode active material layers 12 on two surfaces of the anode current collector 11 and a symmetrical electrode structure is formed. Examples of the electrolyte used for the solid electrolyte layer 13 include sulfide-based solid electrolytes, such as $Li_2S$—$P_2S_5$, $Li_2S$—$B_2S_3$, $Li_2S$—$SiS_2$, and $Li_2S$—$GeS_2$, and oxide-based amorphous solid electrolytes, such as $Li_2O$—$B_2O_3$—$P_2O_5$ and $Li_2O$—$SiO_2$. In addition, a crystalline oxide such as $Li_7La_3Zr_2O_{12}$ is generally used. In the method of manufacturing the all-solid-state battery according to the embodiment of the present invention, there is no particular restriction on the electrolyte used for the solid electrolyte layer 13, and various materials generally used for all-solid-state batteries can be used.

Figure 2D:
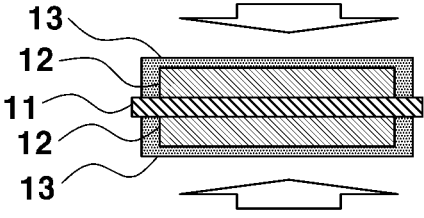

FIG. 2D illustrates the state in which the symmetrical electrode structure formed in FIG. 2C is pressed at a preliminary pressing pressure lower than the final pressing pressure. A press die is used for the preliminary pressing, but the press die is omitted in FIG. 2D.

TABLE 1

|  | Ingredient | Mohs hardness |
|---|---|---|
| Anode active material | Graphite | 1~2 |
| Cathode active material | $LiCoO_2$ $LiNi_{1/3}Co_{1/3}Mn_{1/3}O_2$ $LiNi_{0.85}Co_{0.10}Al_{0.05}O_2$ | 6~8 |

Table 1 is a table showing ingredients of the anode active material and the cathode active material mainly used for the anode active material layer 12 and the cathode active material layer 22, respectively, and the Mohs hardness of the ingredients. The Mohs hardness of graphite, which is the anode active material, is 1 to 2, while the Mohs hardness of the ingredient of the cathode active material is 6 to 8, which is relatively high. For this reason, when the anode active material layer 12 and the cathode active material layer 22 formed in the same manner are laminated and pressed, the anode active material layer 12 is more greatly deformed. Therefore, when the cathode active material layer 22 is formed to be smaller than the anode active material layer 12, a portion of the anode active material layer 12 facing the anode active material layer 22 is intensively compressed. This non-uniform compression causes the cathode active material layer 22 to break the solid electrolyte layer 13, which is interposed between the anode active material layer 12 and the cathode active material layer 22, and erosion of the cathode active material layer 22 into the anode active material layer 12.

The preliminary pressing is performed in order to overcome these disadvantages, and is performed at a pressure, for example, 100 MPa, lower than the final pressing pressure, 500 MPa. The anode active material layer 12 is densified by the preliminary pressing, so deformation at the time of final pressing is reduced, and breakage of the solid electrolyte layer 13 and the erosion of the cathode active material layer 22 into the anode active material layer 12 can be suppressed. As the pressure of the preliminary pressing increases, the effect of preventing the erosion into the cathode active material layer 22 can be improved. However, if the pressure of the preliminary pressing is excessively high, the solid electrolyte layer 13 becomes dense and excessively hard, and adhesion with the solid electrolyte layer 23 formed at the side of the cathode active material layer is deteriorated at the time of final pressing. For this reason, the pressure of preliminary pressing is preferably 100 MPa or less.

Figure 2E:
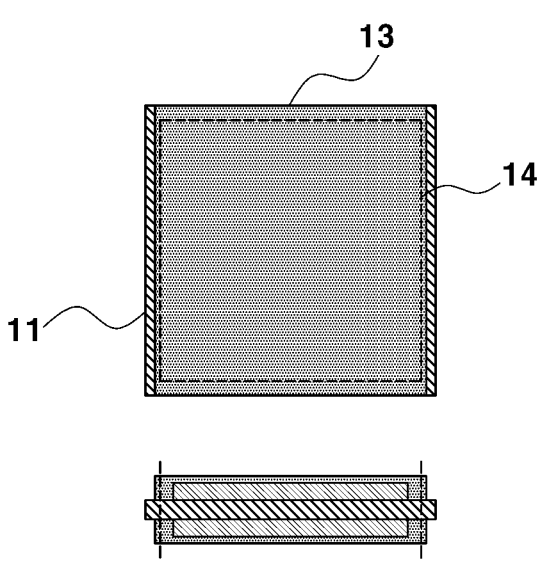
Figure 2F:
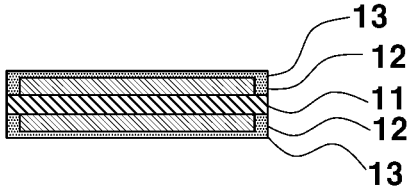

FIG. 2E illustrates a state in which punching is performed so as to remove the end of the anode 10 after preliminary pressing. Although the pressure during preliminary pressing is not as high as that of the final pressing, the end located on the outer periphery of the anode 10 is easily deformed by the preliminary pressing. Therefore, the anode active material layer 12 and the solid electrolyte layer 13 are used after punching a central portion thereof that is uniformly compressed while maintaining a planar shape. At this time, punching is performed at a position at which the solid electrolyte layer 13 remains on the side surface of the anode active material layer 12. As a result, the anode 10 is produced as shown in FIG. 2F.

FIGS. 3A-3E are schematic diagrams illustrating a method of manufacturing a cathode of an all-solid-state battery according to an embodiment of the present invention. FIGS. 3A-3E illustrate a change in the structure following the progression of the method of manufacturing the cathode from FIG. 3A to FIG. 3E.

Figure 3A:
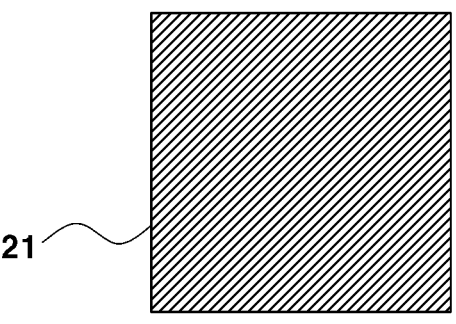
FIGS. 3A-3E are schematic diagrams illustrating a method of manufacturing a cathode of an all-solid-state battery according to an embodiment of the present invention.
Figure 3A:

FIG. 3A illustrates the state in which a resin sheet 24 is attached to one surface of the cathode current collector 21 serving as a base. The cathode current collector 21 also has a flat plate shape. Aluminum is often used for the cathode current collector 21, but stainless steel, nickel, or the like may be used.

The cathode active material made of oxide particles used for the cathode active material layer 22 of the cathode 20 is harder than the anode active material, as shown in Table 1, and pressure distribution thereof tends to become non-uniform during final pressing. The resin sheet 24 serves to uniformize the pressure distribution applied to the cathode 20 at the time of final pressing, and for this reason, appropriate elasticity is required. In addition, a drying step may be included in the formation of the cathode active material layer 22, so heat resistance is also required.

Table 2 shows the Young's modulus (modulus of elasticity) and heat-resistance temperature of the resin material that can be used for the resin sheet 24. Characteristics suitable for uniformizing the pressure distribution with respect to the final pressing pressure of 500 MPa are that the Young's modulus (modulus of elasticity, E) is preferably in the range of $1.5 \leq E \leq 3.5$ and that the heat-resistance temperature is preferably $100°$ C. or higher. Considering these requirements, the resin sheet 24 may be formed of any one of polypropylene, polycarbonate, and polyethylene terephthalate, among the resin materials shown in Table 2.

TABLE 2

| Resin material | Modulus of elasticity (GPa) | Heat resistance temperature (° C.) |
|---|---|---|
| Polyethylene (PE) | 0.4~1.3 | 100~118 |
| Polypropylene (PP) | 1.5~2 | 125~144 |
| Polystyrene (PS) | 3~3.5 | 83~95 |
| Polycarbonate (PC) | 2.3 | 139 |
| Polyethylene terephthalate (PET) | 3.2~4.2 | 150 |
| Polyvinyl chloride (PVC) | 2.5~4.2 | 66~79 |
| Polyurethane (PU) | 0.7 | 106 |

Figure 3B:
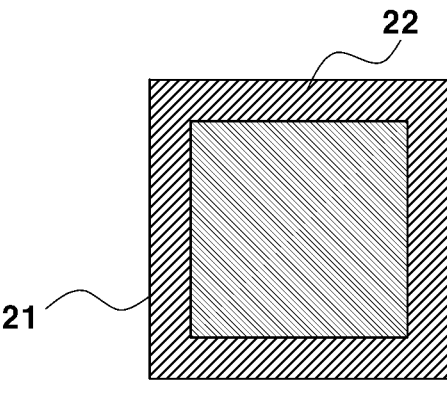
Figure 3B:
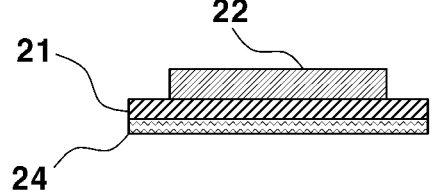

FIG. 3B illustrates the state in which the cathode active material layer 22 is formed on the surface of the cathode current collector 21 on which the resin sheet 24 is not attached such that the cathode active material layer 22 is smaller than the cathode current collector 21, and the cathode current collector 21 is exposed to the outer periphery. As shown in Table 1, the cathode active material used for the cathode active material layer 22 includes $LiCoO_2$, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$, $LiNi_{0.8}oCo_{0.15}Al_{0.05}O_2$, $LiNi_{0.85}Co_{0.10}Al_{0.05}O_2$, or $LiNi_{0.90}Co_{0.07}Al_{0.03}O_2$.

Figure 3C:
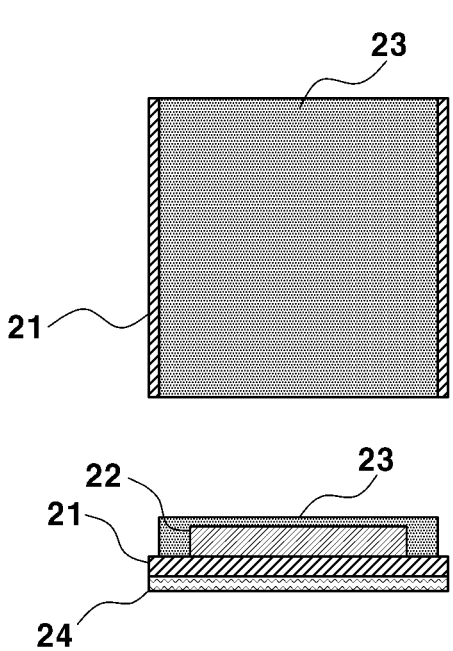

FIG. 3C shows the state in which the solid electrolyte layer 23 is further formed to cover the cathode active material layer 22 and the cathode current collector 21 exposed to the outer periphery. The solid electrolyte layer 23 is laminated and pressed so as to face the solid electrolyte layer 13 of the anode 10 at the time of final pressing, thereby becoming an integrated electrolyte layer. For this reason, the solid electrolyte layer 23 may use the same material as the solid electrolyte layer 13, or an appropriate material suitable for each of the cathode active material layer 22 and the anode active material layer 12 may be used.

Figure 3D:
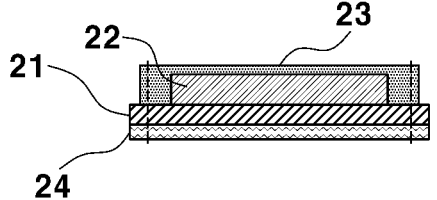

FIG. 3D illustrates the state in which the end is cut and removed. The cutting of the end is performed for combination with the planar shape of the anode 10 while removing an incomplete portion present in the outer periphery.

Figure 3E:
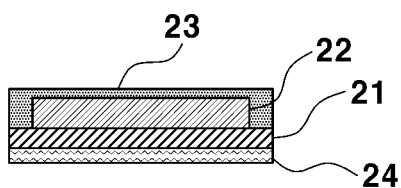

FIG. 3E illustrates the structure of the cathode 20 obtained as a result of cutting. The cathode active material layer 22 is smaller than the cathode current collector 21, but the upper and side surfaces of the cathode active material layer 22 are covered with the solid electrolyte layer 23, so the upper surface of the cathode 20 is entirely flat.

Figure 5:
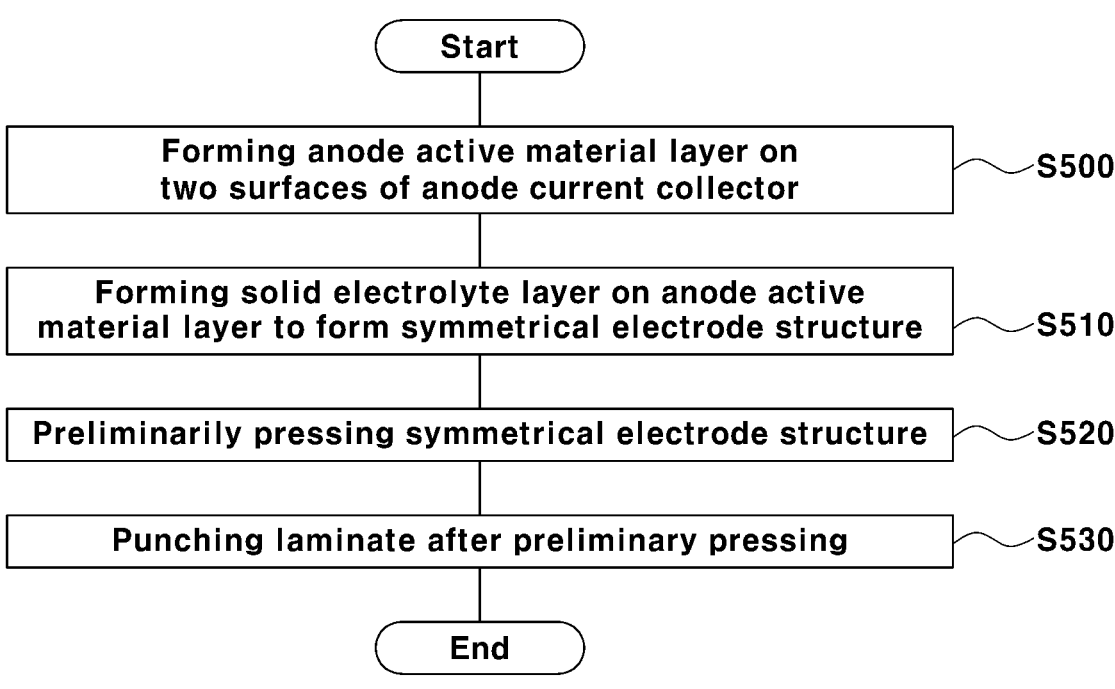
FIG. 5 is a flowchart illustrating a method of manufacturing an anode of an all-solid-state battery according to an embodiment of the present invention.

FIG. 5 is a flowchart illustrating a method of manufacturing an anode of an all-solid-state battery according to an embodiment of the present invention.

Referring to FIG. 5, in step S500, an anode active material layer 12 is formed on two surfaces of a flat-shaped anode current collector 11 in a portion excluding the outer periphery of the anode current collector 11. The method of forming the anode active material layer 12 is not particularly limited. However, in an embodiment, the anode active material layer 12 is formed by applying and drying a paste containing graphite as an anode active material, a solid electrolyte, a binder, and the like.

Then, a solid electrolyte layer 13 is formed on the anode active material layer 12 on each of two surfaces of the anode current collector 11 to form a symmetrical electrode structure (step S510). The method of forming the solid electrolyte layer 13 is not particularly limited, but in the embodiment, the solid electrolyte layer 13 is formed by applying and drying a paste containing a solid electrolyte.

The symmetrical electrode structure includes the anode active material layer 12 formed of graphite having low hardness on both surfaces of the anode current collector 11 and a non-uniform compressive force, applied upon final pressing after the anode active material layer 12 is combined with the cathode 20, may affect the surface. For this reason, the preliminary pressing is performed at a pressure lower than the final pressing pressure in step S520.

Finally, in step S530, punching is performed to expose a uniform laminate in the central portion, excluding the non-uniform peripheral portion, from the electrode structure after preliminary pressing, and the anode 10 used for final pressing is formed.

Figure 6:
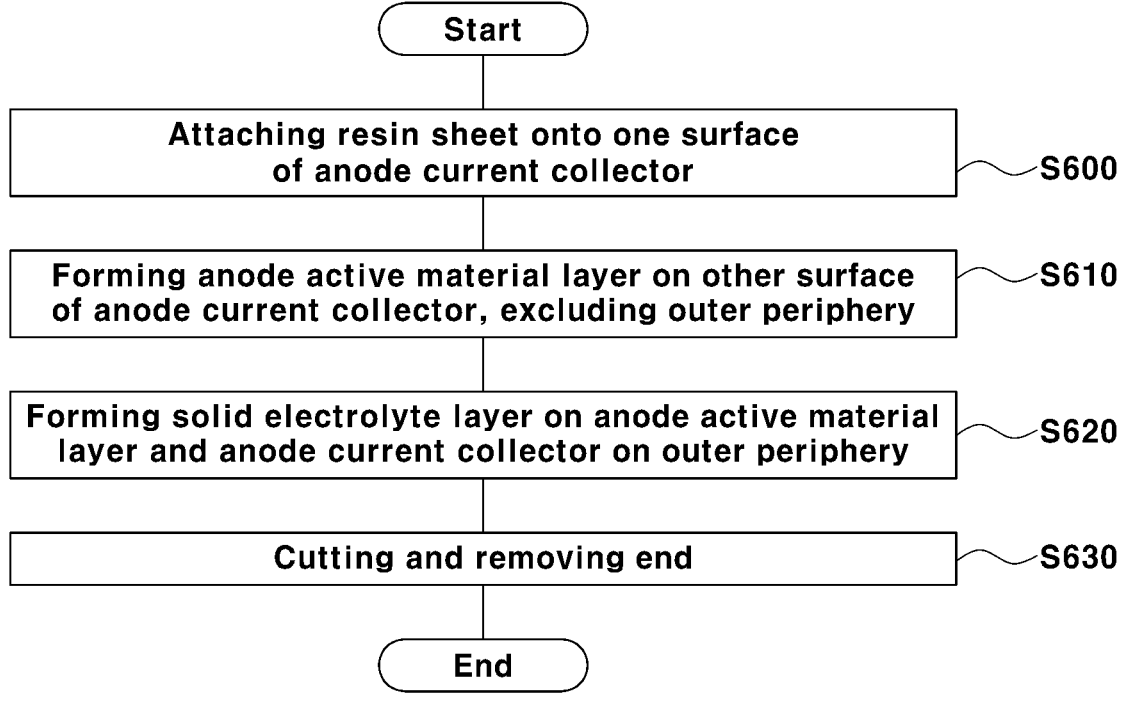
FIG. 6 is a flowchart illustrating a method of manufacturing a cathode of an all-solid-state battery according to an embodiment of the present invention.

FIG. 6 is a flowchart illustrating a method of manufacturing a cathode of an all-solid-state battery according to an embodiment of the present invention.

Referring to FIG. 6, in step S600, a resin sheet 24 is attached to one surface of the cathode current collector 21.

The resin sheet 24 serves to uniformly apply pressure to the laminated structure of the electrode at the time of final pressing, and is unnecessary and thus detached after the final pressing. An adhesive or the like that has heat resistance and does not leave glue is applied to an end of the resin sheet 24.

Next, a cathode active material layer 22 is formed on the other surface of the cathode current collector 21, that is, on the surface of the cathode current collector 21 to which the resin sheet 24 is not attached, excluding the outer periphery of the cathode current collector 21 (step S610). The method of forming the cathode active material layer 22 is not particularly limited. However, in an embodiment, the cathode active material layer 22 is formed by applying and drying a paste containing a cathode active material such as $LiCoO_2$, a conductive material such as carbon, a solid electrolyte, a binder, and the like.

A solid electrolyte layer 23 is further formed on the upper surface of the cathode active material layer 22 and the upper surface of the cathode current collector 21 exposed to the outer periphery of the cathode active material layer 22 (step S620). As a result, the upper and side surfaces of the cathode active material layer 22 are covered with the solid electrolyte layer 23. The solid electrolyte layer 23 may be formed of a material having the same composition as that of the solid electrolyte layer 13, and the method of forming the solid electrolyte layer 23 may be the same as the method of forming the solid electrolyte layer 13.

Finally, an anode 10 is formed by cutting and removing an end so as to have the same planar shape as the cathode 20 (step S630).

FIG. 7 is a flowchart illustrating a method of forming a laminated structure of an all-solid-state battery according to an embodiment of the present invention.

Referring to FIG. 7, in step S700, a cathode 20 is laminated on both surfaces of the anode 10 such that the cathode 20 faces the solid electrolyte layer 23, and a laminate having a cathode 20/anode 10/cathode 20 structure is formed. This configuration results in the resin sheet 24 being disposed on the uppermost surface and the lowermost surface of the formed laminate.

The formed laminate is accommodated in the press die 30 and is pressed at a final pressing pressure (step S710).

The cathode 20 and the anode 10 have the same planar shape, the surfaces of the cathode 20 and the anode 10 in contact with each other are formed to be flat, the anode 10 is preliminarily pressed in advance, and a resin sheet 24 is attached to the surface of the anode 10 that is in contact with the press die 30, so even if final pressing is performed at a high pressure of 500 MPa, pressure is uniformly applied to the laminated structure, thereby preventing a short circuit due to contact between the cathode 20 and the anode 10. Further, by providing the elastic body 35 on the outer peripheral wall 34 of the groove 33 of the press die 30, deformation of side surfaces of the cathode 20 and the anode 10 during final pressing is suppressed. Therefore, deterioration of the quality of the electrode structure of the all-solid-state battery can be prevented.

After the final pressing, the laminated structure is removed from the press die 30, and the resin sheet 24 is peeled off (step S720) to form an electrode structure of an all-solid-state battery.

The produced laminated structure is accommodated in a housing case in such a way that the anode 10 and the cathode 20 are connected to external anode and cathode terminals to complete production of an all-solid-state battery.

As is apparent from the foregoing, embodiments of the present invention provide an all-solid-state battery wherein both the cathode active material layer and the anode active material layer have surfaces covered with a solid electrolyte layer, and the outer periphery of the cathode active material layer, which is smaller than the anode active material layer, is also covered with the solid electrolyte layer, so it is possible to prevent the occurrence of a short circuit due to deformation of the end of the cathode active material layer and the anode active material layer upon final pressing after lamination of the anode active material layer and the cathode active material layer. In addition, the periphery of the cathode active material layer is covered with the solid electrolyte layer, so the cathode active material layer and the anode active material layer contact each other on planar surfaces having the same size, thus making it possible to eliminate the occurrence of excessive concentrated stress in the anode active material layer and prevent the occurrence of a short circuit with the anode active material layer due to erosion of the cathode active material layer.

Embodiments of the present invention also provide a method of manufacturing an all-solid-state battery wherein an anode active material layer is formed on both surfaces of an anode current collector, a solid electrolyte layer is further formed on the anode active material layer, and then an anode is formed by pressing at a preliminary pressing pressure lower than the final pressing pressure, so the density of the anode active material layer, which is softer than the cathode active material layer, is increased, and is then laminated with the cathode active material layer and finally pressed, making it possible to suppress the erosion of the cathode active material layer on the anode active material layer. In addition, the laminated structure after final pressing has symmetry, so it is possible to provide an all-solid-state battery in which the occurrence of warping is suppressed.

Further, with the method of manufacturing an all-solid-state battery according to embodiments of the present invention, it is possible to provide an all-solid-state battery wherein uniform pressure distribution at the time of final pressing can be realized, cracks in the active material layer or the cathode active material layer can be prevented, and performance can be secured by performing final pressing after the resin sheet is attached to the surface that is in contact with the press die of the cathode current collector.

The present invention has been described in detail with reference to preferred embodiments. However, it will be appreciated by those skilled in the art that changes may be made in these examples without departing from the principles and spirit of the present invention, the scope of which is defined in the appended claims and their equivalents.

What is claimed is:

1. A method of manufacturing an all-solid-state battery, the method comprising:
   forming an anode active material layer on opposite surfaces of an anode current collector, the anode active material layer being smaller than the anode current collector and the anode current collector being exposed to an outer periphery;
   forming a first solid electrolyte layer on the anode active material layer on the opposite surfaces of the anode current collector to cover exposed surfaces of the anode active material layer and to form a symmetrical electrode structure;
   pressing the symmetrical electrode structure at a preliminary pressing pressure lower than a final pressing pressure to form an anode;
   forming a cathode active material layer on a first surface of a cathode current collector, the cathode active material layer being smaller than the cathode current collector and the cathode current collector being exposed to the outer periphery;
   forming a second solid electrolyte layer covering the cathode active material layer and the cathode current collector on the outer periphery to form a first cathode having the same planar shape as the anode;
   forming a second cathode substantially identical to the first cathode;
   forming a laminate by laminating the first cathode and the second cathode on opposite surfaces of the anode, respectively, the second solid electrolyte layers of the first cathode and the second cathode facing the anode; and
   pressing the laminate at the final pressing pressure,
   wherein:
      forming the first cathode comprises attaching a first resin sheet to a second surface of the cathode current collector prior to forming the cathode active material layer on the first surface of the cathode current collector;
      forming the second cathode comprises forming the second cathode with a second resin sheet; and
      pressing the laminate at the final pressing pressure comprises pressing the first cathode with the first resin sheet attached and the second cathode with the second resin sheet attached,
   wherein pressing the laminate at the final pressing pressure is performed in a press die, the press die comprising upper and lower dies each comprising an elastic body on an outer peripheral wall of a groove configured to accommodate the anode and the first and second cathodes after lamination.

2. The method according to claim 1, wherein the elastic body prevents lateral deformation of the first cathode, the second cathode, and the anode after forming the laminate.

3. The method according to claim 1, further comprising detaching the first resin sheet from the first cathode and detaching the second resin sheet from the second cathode after pressing the laminate at the final pressing pressure.

4. The method according to claim 1, wherein the preliminary pressing pressure is 100 MPa or less and the final pressing pressure is 500 MPa or more.

5. A method of manufacturing an all-solid-state battery, the method comprising:
   forming an anode, wherein forming the anode comprises:
      forming an anode active material layer on opposite surfaces of an anode current collector, the anode active material layer being smaller than the anode current collector and the anode current collector being exposed to an outer periphery;
      forming a first solid electrolyte layer on the anode active material layer on the opposite surfaces of the anode current collector to cover exposed surfaces of the anode active material layer to form a symmetrical electrode structure;
      pressing the symmetrical electrode structure at a preliminary pressing pressure lower than a final pressing pressure; and
      punching the symmetrical electrode structure to remove a peripheral area of the symmetrical electrode structure;
   forming first and second cathodes each having a same planar shape as the anode, wherein forming the first and second cathodes comprises:
      forming a cathode active material layer on a first surface of a cathode current collector, the cathode active material layer being smaller than the cathode current collector and the cathode current collector being exposed to the outer periphery; and forming a second solid electrolyte layer covering the cathode active material layer and the cathode current collector on the outer periphery;

forming a laminate by laminating the first cathode and the second cathode on opposite surfaces of the anode, respectively, the second solid electrolyte layers of the first cathode and the second cathode facing the anode; and pressing the laminate at the final pressing pressure, wherein:

forming the first and second cathodes further comprises attaching a resin sheet to a second surface of the cathode current collector prior to forming the cathode active material layer on the first surface of the cathode current collector; and pressing the laminate at the final pressing pressure comprises pressing the first and second cathodes with the resin sheets attached wherein pressing the laminate at the final pressing pressure is performed in a press die, the press die comprising upper and lower dies each comprising an elastic body on an outer peripheral wall of a groove configured to accommodate the anode and the first and second cathodes after lamination.

6. The method according to claim 5, wherein the elastic body prevents lateral deformation of the first cathode, the second cathode, and the anode after forming the laminate.

7. The method according to claim 5, further comprising detaching the resin sheet from the first and second cathodes after pressing the laminate at the final pressing pressure.

8. The method according to claim 5, wherein forming the first and second cathodes further comprises cutting and removing ends of the first and second cathodes.

9. The method according to claim 5, wherein the preliminary pressing pressure is 100 MPa or less.

10. The method according to claim 9, wherein the final pressing pressure is 500 MPa or more.

11. An all-solid-state battery prepared by the method of claim 1, the all-solid-state battery comprising:

an anode comprising:

an anode current collector;

first and second anode active material layers on opposite surfaces of the anode current collector, respectively, wherein each of the first and second anode active material layers is smaller than the anode current collector; and first and second solid electrolyte layers covering the first and second anode active material layers and the anode current collector on an outer periphery, respectively; and first and second cathodes on opposite sides of, and having a same planar shape as, the anode, each of the first and second cathodes comprising:

a cathode current collector;

a cathode active material layer on a first surface of the cathode current collector, wherein the cathode active material layer is smaller than the cathode current collector; and a third solid electrolyte layer covering the cathode active material layer and the cathode current collector on the outer periphery, wherein the third solid electrolyte layer of each of the first and second cathodes faces the anode.

12. The all-solid-state battery according to claim 11, further comprising a housing, wherein the anode and the first and second cathodes are connected to external anode and cathode terminals, respectively.

* * * * *